Dec. 24, 1935.   L. SEGERSTROM   2,025,131
DRIVE ATTACHMENT FOR AUTOMOBILES
Filed Aug. 12, 1933   2 Sheets-Sheet 1

INVENTOR
Ludwig Segerstrom
BY
Wooster Davis
ATTORNEYS

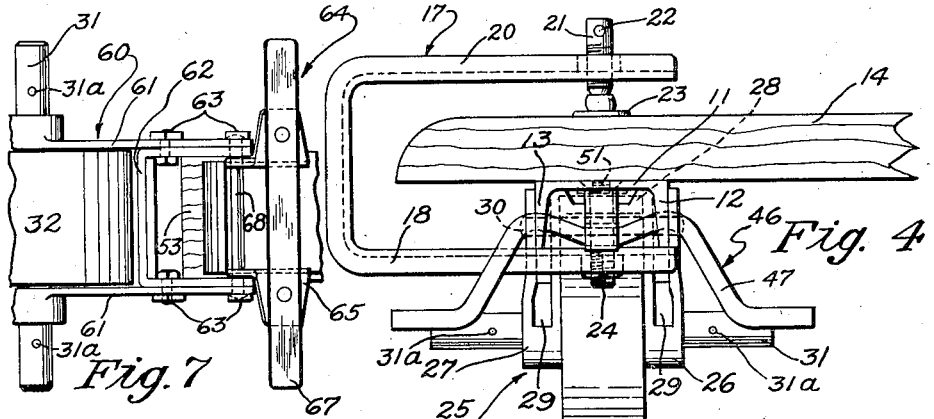
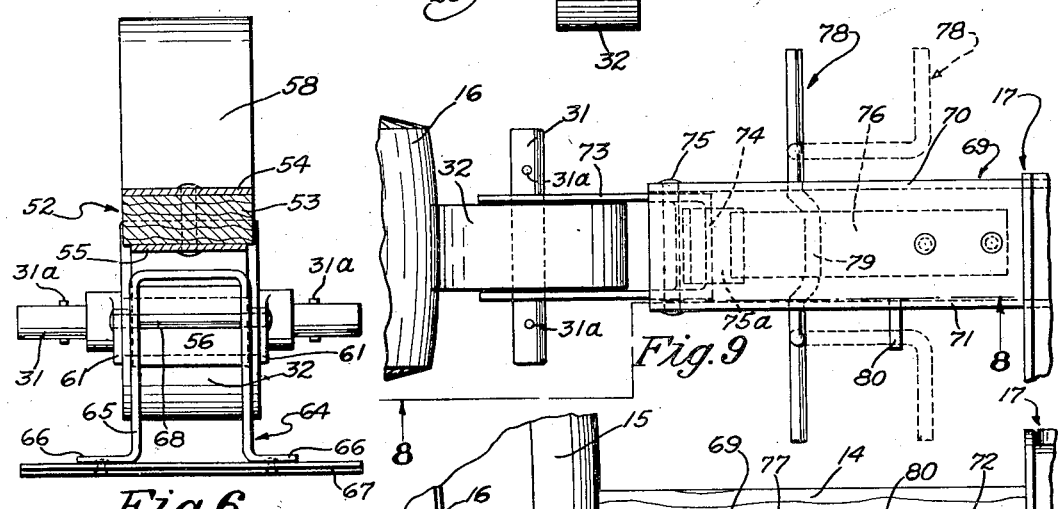
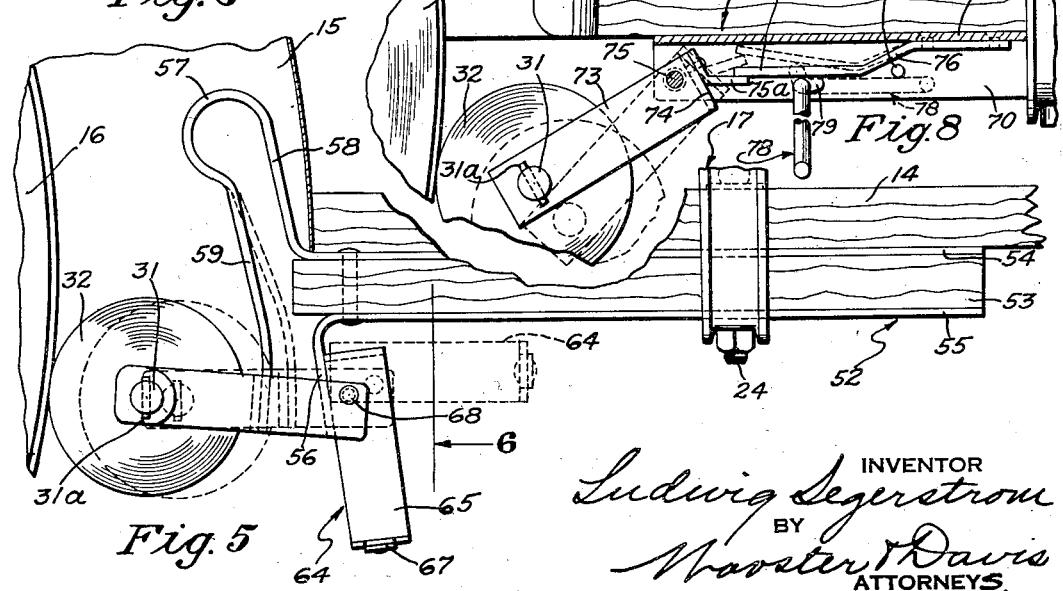

Patented Dec. 24, 1935

2,025,131

UNITED STATES PATENT OFFICE 2,025,131

DRIVE ATTACHMENT FOR AUTOMOBILES

Ludwig Segerstrom, Shelton, Conn.

Application August 12, 1933, Serial No. 684,798

11 Claims. (Cl. 74—13)

This invention relates to new and useful improvements in drive attachments for automobiles and has for an object to provide a simple and easily applied means through which power may be taken from a jacked-up driven wheel of an automobile.

Another object is to provide an attachment as stated and which may be applied or attached to either running board of an automobile and which may be easily and quickly put into and out of operation while so attached to the running board of the automobile.

Other advantages and objects will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

Fig. 4 is an end view looking from the right in Fig. 2;

Fig. 5 is a view somewhat similar to Fig. 2 but showing a modified construction;

Fig. 6 is a view partly in section and partly in elevation and taken substantially along the line 6 of Fig. 5;

Fig. 7 is a bottom plan view of the device as shown in Fig. 6;

Fig. 8 is a view partly in section and partly in side elevation and showing a further modified construction; and Fig. 9 is a top plan view of the device of Fig. 8.

Figure 1:
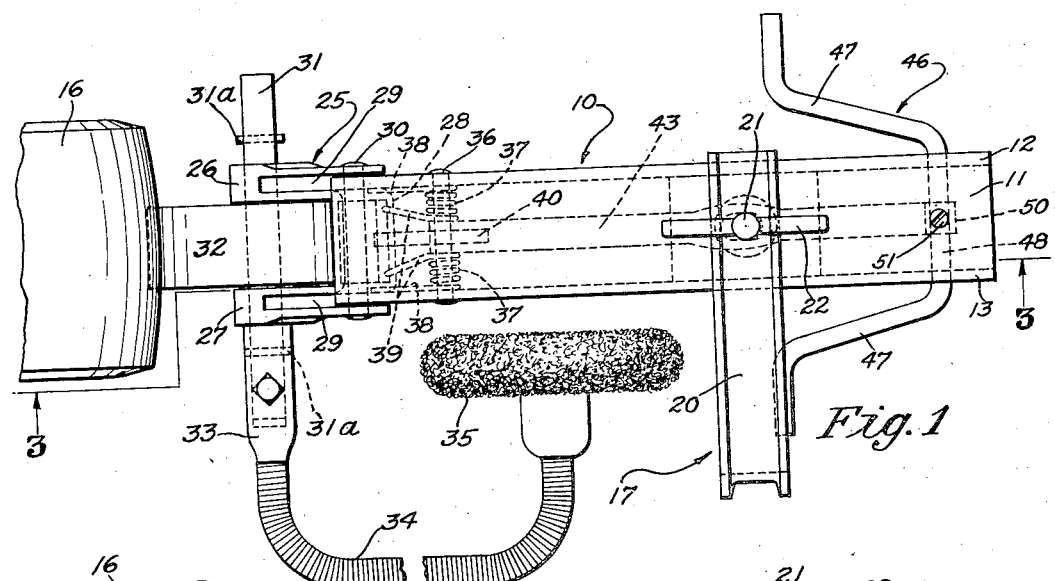
Fig. 1 is a top plan view of an improved drive attachment constructed according to the present invention.

Referring in detail to the drawings and at first particularly to Figs. 1 through 4 thereof, the numeral 10 generally designates the body of my improved drive attachment and as here disclosed this body comprises a length of channel iron including a connecting portion 11 and sides or flanges 12 and 13. All of the moving or operating parts of the drive attachment are mounted on or attached to the body 10 and the latter is adapted to be clamped against the underside of the running-board of an automobile when the attachment is to be used to take power from a driven wheel of the automobile.

A portion of the running-board of an automobile is shown at 14 and a portion of a fender or mudguard and a portion of a rear wheel of an automobile are shown at 15 and 16 respectively. For the purpose of securing the body 10 against the underside of the running-board 14 any suitable means may be used although it is preferred to use the U-shaped clamp 17 disclosed in the drawings. The lower arm 18 of this clamp extends beneath the body 10 and may bear against the edges of the flanges thereof and against a guide and filler block 19 disposed within the channel and the full function of which will later be described. Carried by the upper arm 20 of the clamp is an adjustable screw 21 which may be provided with a cross pin or other means 22 whereby the screw is more easily turned. On its lower end, the screw carries a clamping plate 23 which may be secured thereto by a ball and socket joint as shown or by any other suitable means.

Obviously to secure the body 10 against the underside of the running-board 14 it is but necessary to dispose the body against the running-board with the clamp 17 so arranged that its upper arm 20 extends over the upper side of the running-board. Then on tightening of the screw 21 the clamping plate or disc 23 carried thereby will be forced against the running board and the body will be secured in place. It is to be noted that the clamp 17 is secured to the body by means of a bolt 24 extending through the lower arm of the clamp and through the body and through the block 19. This bolt pivotally attaches the clamp to the body and the relationship of the parts is such that the clamp may be swung from a position at one side of the body as shown in Fig. 1 to a corresponding position at the other side of the body. The clamp will be swung to one side or the other of the body depending on which running board of the automobile the attachment is to be secured to and since the clamp is shiftable as described it will be apparent that the body may be clamped to either running board of the automobile with the end portions of the body of the attachment disclosed in the same relationship to the automobile. It is, however, not necessary to connect the clamp 17 to the member 10 as it will be apparent this clamp will clamp the member 10 to the running-board and hold it there even though the bolt 24 or other securing means is omitted. It is, however, preferred to secure the clamp to the member 10 by the pivot as then the parts are always together.

Pivotally mounted on the rear end portion of the body 10 is a frame 25 which is generally U-shaped including side arms 26 and 27 and a connecting portion 28. Each of the arms 26 and 27 is bifurcated as at 29 and the frame is mounted on the body 10 in such relation that the flanges 12 and 13 of the body enter the bifurcations 29 of the arms 26 and 27 respectively and the connecting portion 28 of the frame is disposed within the body or between the side flanges thereof. The pivotal mounting may comprise any suitable means as, for example, the pin 30 extending through both flanges of the body and both arms of the frame.

A shaft 31 extends through the outer end portions of the arms 26 and 27 and between said arms has mounted on it a roller 32, the roller and shaft being keyed or otherwise secured together so as to rotate as a unit, the arms of the frame providing bearings. The shaft extends for a suitable distance at each side of the frame and its end portions may carry cross pins 31a or other means forming a portion of the coupling the complement to which may be such as shown at 33 connected with a flexible shaft 34. Of course, a rigid shaft or other type of flexible shaft may be used in place of that shown at 34 and to the outer end of the connected shaft there may be attached a polishing head 35 or other desired tool. Since shaft 31 extends at each side of the frame it will be apparent that one end portion of the shaft will extend outwardly with relation to the side of the automobile irrespective of the running-board of the automobile to which the device is attached.

Extending transversely of the body 10 and having its end portions mounted in the flanges 12 and 13 is a bar 36. A pair of torsion springs 37 are arranged on the bar 36 and each spring is arranged with one end portion 38 bearing against the connecting portion 11 of the body and with an end portion 39 bearing against and hooked into the connecting portion 28 of the frame 25. The springs are arranged in opposite sides of the center of the bar 36 and pivotally mounted on the central portion of the bar is a dog 40 having a portion 41 extending under the connecting bar 28 of the frame. In its upper side the dog 40 is notched as at 42 and a slide 43 is arranged within the body 10 against the inner surface of the connecting portion 11 thereof and has one end portion 44 downwardly bent and disposed in the notch 42.

The slide 43 extends forwardly from its downturned end 44 and passes through a groove or notch 45 in the upper side of the block 19, which block serves as a guide and mounting for the slide. Extending through the forward end portion of the flanges 12 and 13 of the body is a crank member or means 46 including oppositely extending side arms 47 and a connecting portion 48 the intermediate portion of which is offset as best shown at 49 in Fig. 3. About this offset portion of the crank means the forward end 50 of the strap or slide 43 is wrapped whereby to connect the said strap or slide with the crank means. The crank means is turnable or rockable on the body 10 and rocking movement of the crank means will result in a flexing and sliding of the slide 43.

Figure 2:
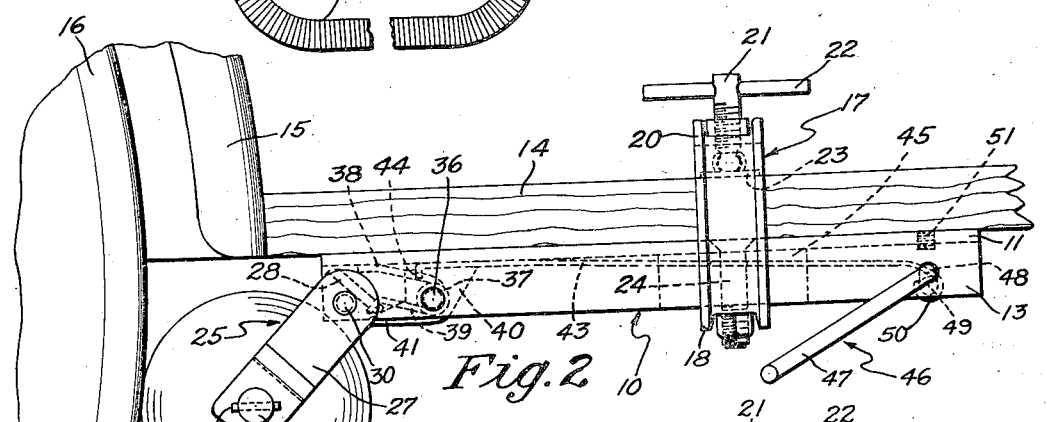
Fig. 2 is a side elevational view thereof the attachment being shown applied to the running board of an automobile and with its power take-off roller in engagement with the tire of a rear wheel of an automobile.
Figure 3:
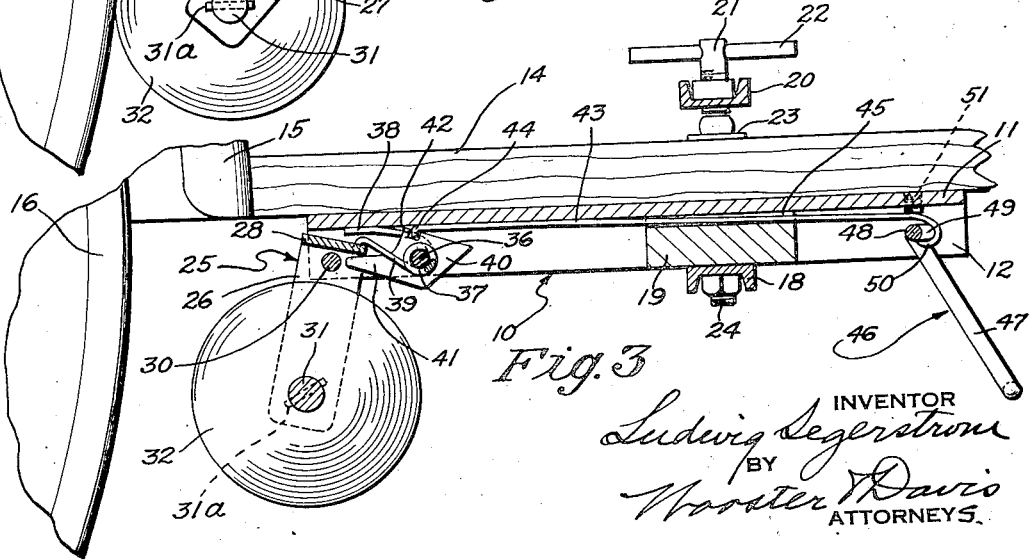
Fig. 3 is a longitudinal sectional view taken substantially along the plane of the line 3—3 of Fig. 1 and showing the device with its take-off roller out of engagement with the tire of the rear wheel of the automobile.

In Fig. 2 the crank means is shown in its rear position and when the crank means is in this position the slide 43 is disposed rearwardly and the torsion springs 37 acting against the connecting portion 28 of the frame 25 rock said frame rearwardly, and if the body 10 is properly positioned on the running board, carry the roller 32 into engagement with the tread of the wheel 16 of the automobile. With the roller so positioned the wheel will cause the roller to rotate and the shaft 31 will be driven as will any desired tool or instrument connected with the shaft. When it is desired to discontinue the driving of the roller it is but necessary to swing the crank means 46 from the position of Figs. 1 and 2 to that of Fig. 3 and it will be noted that such movement of the crank means carries the slide 43 slightly forwardly rocking the dog 40 about the bar 36 and causing the portion 41 of the dog to press upwardly on the lower edge portion of the connecting bar of the frame. This results in a rocking or swinging movement of the frame in opposition to the action of the springs 37 so that the roller is carried away from the wheel 16 into the position of Fig. 3 and will no longer be driven.

As the crank means is swung from one position to another it passes through a dead center position and thereafter is snapped into one or the other of its extreme positions. The snapping force is presented by the slide 43 which as shown is in the form of a flat spring strip. A screw or other stop means 51 is provided and extends through the connecting portion 11 of the body and this screw may be adjusted up and down. The screw is engaged by the forward portion of the slide 43 when the crank means 47 is operated to carry the roller 32 to an inoperative position, and the screw is adjusted to control the throw.

Referring now particularly to Figs. 5, 6 and 7, the body of the driving attachment as there disclosed is generally designated 52 and includes a block 53 which may be of wood and to the upper and lower sides of which strap portions 54 and 55 are applied. The clamp 17 is pivotally secured to the body 52 as by the bolt 24 and is shiftable from one side to the other of the body as will be understood. Strap 55 has its rear end portion downturned providing a flange 56 and strap 54 has its rear end portion bent upwardly and looped as at 57 thereby providing arms 58 and 59. It will be apparent that this looped portion of the strap 54 provides a spring.

A frame 60 including spaced parallel arms 61 is provided and in addition to the side arms 61 this frame 60 includes a U-shaped member 62 arranged between the arms 61 and having its side arms secured to the forward portions of said arms as by bolts or the like 63. In their outer end portions the arms 61 mount the shaft 31 above described and secured on this shaft is the roller 32. Frame 60 is arranged with the inner or forward portions of its arms 61 straddling the flange 56 and disposed between and pivoted to such forward portions of the arms 61 is an operating member generally designated 64. The arm 59 of the spring extends into the frame 60 and is therein connected in any suitable manner with the connecting portion of the member 62.

The frame 64 includes a U-shaped portion or element 65 having the free ends of its arms outturned as shown at 66 and riveted or otherwise secured to a cross bar or member 67. A cross pin 68 functions to pivotally secure the operating frame or member 64 to the forward or inner portions of the side arms 61 of frame 60 and such pin extends through said side arms and through the arms of the U-shaped portion or element 65 of the operating frame. The spring arm 59 constantly tends to move away from the flange 56 and it is therefore the constant tendency of the arm 59 to shift the frame 60 rearwardly so as to carry the roller 32 into engagement with the periphery of the wheel 16.

When the operating member 64 is in the full line position of Fig. 5, the spring has acted to shift the frame 60 rearwardly and it will be noted that the connecting portion of the element 65 is in engagement with the forward or inner face of the flange 56. Also, it will be noted that such connecting portion of element 65 is located above the pivot pin 68. Therefore, on engaging the cross bar 67 of the operating member and swinging the same forward and upwardly with the connecting portion of element 65 fulcruming on the flange 56 the frame 60 is drawn forwardly against the action of the spring so that the parts will be located in their dotted line positions of Fig. 5 with the roller 32 out of engagement with the wheel 16.

As the operating member 64 is swung upwardly to the dotted line position of Fig. 5 it is moved through a dead center position and is yieldingly held in the dotted line position of Fig. 5 by the action of the spring in constantly tending to move the frame 60 and roller 32 rearwardly. From the foregoing, it will be apparent that the drive attachment of Figs. 5, 6 and 7 may be easily and quickly applied to either running-board of an automobile and that while in place thereon may be easily and quickly adjusted to permit the spring to move the roller into engagement with the automobile wheel or to draw the roller out of engagement with the wheel against the action of the spring.

Referring now to Figs. 8 and 9, the body of the driving attachment is there generally designated 69 and is shown as formed of a length of channel iron including side flanges 70 and 71 and a connecting portion 72. The clamping means 17 previously described may be applied to the body 69 as described in connection with Figs. 1 through 4 and serves the purpose stated when considering said figures. Pivotally mounted between the flanges 70 and 71 of the body is a U-shaped frame 73, the connecting portion 74 of which is disposed within the body. Mounted between the arms of this frame on the shaft 31 is the roller 32. The pivot for the frame 73 is designated 75 and while this pivot is arranged inwardly of the connecting portion of the frame an extension 75a carried by said connecting portion projects forwardly thereof.

To the underside of the connecting portion 72 of the body there is secured a leaf spring 76 one portion 77 of which is adapted to assume the full line position of Fig. 8 in which position it is spaced from and substantially parallel with the connecting portion of the body 69. The free end portion 77 of spring 76 is in engagement with the extension 75a on the frame 73 and normally acts to press downwardly on said extension to rock said frame about its pivot 75 and carry the roller 32 into engagement with the periphery of wheel 16.

Mounted in the side flanges of the body is a crank means 78 having an offset portion 79 within the body of the attachment and beneath the free portion of the spring 76. When this crank means is in the full line position shown in the drawings its offset portion 79 is arranged substantially horizontally and the spring 76 is free to act on the frame 73 and rock it about its pivot to press the roller 32 into engagement with the wheel 16. However, when the crank means is swung into its dotted line position its offset portion 79 is rocked into a substantially vertical position and forces the free portion 77 of the spring upwardly in a direction away from the frame extension 75a so that the frame may gravitate downwardly carrying the roller 32 away from the wheel 16. A stop pin 80 may be provided to limit movement of the crank means in one direction.

From the foregoing description taken in connection with the drawings it will be apparent that I have provided a drive attachment which may be easily and quickly applied to the running-board of an automobile. Further, it will be apparent that the attachment owing to the pivotal mounting of the clamp 17 may be applied to either running-board of an automobile with the attachment occupying the same relation to the automobile. When the attachment is in place in the various forms of the invention it may be easily operated to have the roller 32 pressed against the periphery of the driving wheel of the automobile. Also that by a simple manipulation the roller may be drawn away from such wheel or may be permitted to gravitate away from the wheel. Any desired tool or means, such for example as a polisher, a drill, an air pump, vacuum cleaner, etc. may be connected with either extending end portion of the shaft 31 to be driven by power derived from the automobile.

Having thus set forth the nature of my invention, what I claim is:

1. In a drive attachment for automobiles, a body, a clamp having an open end to receive a running board, means pivotally attaching the clamp to the body, said clamp movable on said means to dispose the open end of the clamp at either side of the body whereby to clamp the body to the running-board at either side of an automobile with the body having its ends disposed in the same relation to the running-board of the automobile, means movably mounted on said body, a roller, a shaft mounting said roller on said means and extending from each side of the roller, spring means normally tending to move said means and the roller in one direction relative to said body, and manually operable means for moving said means and roller in the opposite direction relative to said body.

2. In a drive attachment for automobiles, a body, a clamp having an open end to receive a running board, means pivotally attaching the clamp to the body, said clamp movable on said means to dispose the open end of the clamp at either side of the body whereby to clamp the body to the running board at either side of an automobile with the body having its ends disposed in the same relation to the running board of the automobile, means pivotally mounted on said body, a roller, a shaft mounting said roller on said means and extending from each side of the roller, spring means normally tending to rock said means and the roller in one direction relative to said body, and manually operable means for rocking said means and roller in the opposite direction relative to said body.

3. In a drive attachment for automobiles, a body, a frame, means pivoting said frame to the body, a roller rotatably mounted on said frame, spring means normally tending to rock said frame in one direction, a pivoted dog engaging said frame, a slide on said body and connected with said dog, and manually operable means to operate said slide to rock said dog and move said frame against the action of said spring.

4. In a drive attachment for automobiles, a body, a frame, means pivoting said frame to the body, a roller rotatably mounted on said frame, spring means normally tending to rock said frame in one direction, a pivoted dog engaging said frame, a slide on said body and connected with said dog, an operating means pivotally mounted on said body, and said operating means including an offset portion connected with said slide and adapted on turning movement in one direction to permit the spring to rock the frame and on movement in the opposite direction draw said slide forwardly and rock the body against the action of the spring.

5. In a drive attachment for automobiles, a body, a frame, means pivoting said frame to the body, a roller rotatably mounted on said frame, spring means normally tending to rock said frame in one direction, a pivoted dog engaging said frame, a slide on said body and connected with said dog, an operating means pivotally mounted on said body for movement in opposite directions across dead center, said operating means including an offset portion connected with said slide and adapted on turning movement across dead center in one direction to permit the spring to rock the frame and on movement across dead center in the opposite direction draw said slide forwardly and rock the frame against the action of the spring, and said slide comprising a spring member to snap said operating means to either side of dead center.

6. In a drive attachment for automobiles, a body, a frame, means pivoting said frame to the body, a roller rotatably mounted on said frame, spring means normally tending to rock said frame in one direction, a pivoted dog engaging said frame, a slide on said body and connected with said dog, an operating means pivotally mounted on said body, said operating means including an offset portion connected with said slide and adapted on turning movement in one direction to permit the spring to rock the frame and on movement in the opposite direction draw said slide forwardly and rock the frame against the action of the spring, stop means carried by said body, and said stop means adjustable toward and from said slide to limit movement of the slide when rocking the frame against the action of the spring.

7. In a drive attachment for automobiles, a body, a frame, means pivoting said frame to the body, a roller rotatably mounted on said frame, a bar on said body, a coil spring on said bar and bearing at one end against said body and at its other end against said frame and normally tending to rock said frame in one direction on its pivot, a dog pivotally mounted on said bar and engaging the frame, a slide on said body and connected with said dog, and manually operable means on said body and connected with said slide to shift the same to rock said dog on the bar and through said dog rock the frame against the action of the spring.

8. In a driving attachment for automobiles, a channel shaped body, a generally U-shaped frame having its arms bifurcated at their inner ends, means pivotally securing said frame to said body with the flanges of the body in said bifurcations and with the connecting portions of the frame between the flanges of the body, a roller, means rotatably mounting said roller on said frame between the outer portions of the arms thereof, a spring on said body and bearing against the connecting portion of the frame and normally tending to rock the frame in one direction about its pivotal mounting, a dog pivotally mounted on the body and bearing against the connecting portion of the frame, a slide mounted on said body and connected at one end to said dog, a crank pivotally mounted on said body, said crank including an offset portion connected to the other end of said slide, and said crank rockable on the body to shift said slide and cause said dog to act against the frame to rock the latter against the action of the spring.

9. In a drive attachment for automobiles, a channel shaped body, a generally U-shaped frame having its arms bifurcated at their inner ends, means pivotally securing said frame to said body with the flanges of the body in said bifurcations and with the connecting portion of the frame between the flanges of the body, a roller, means rotatably mounting said roller on said frame between the outer end portions of the arms thereof, a spring on said body and bearing against the connecting portion of the frame and normally tending to rock the frame in one direction about its pivotal mounting, and manual means to rock said frame on the body against the action of said spring.

10. In a drive attachment for automobiles, a channel shaped body, a generally U-shaped frame having its arms bifurcated at their inner ends, means pivotally securing said frame to said body with the flanges of the body entering said bifurcations and with the connecting portions of the frame between the flanges of the body, a roller, means rotatably mounting said roller on said frame between the outer portions of the arms thereof, a bar within said body and extending between the flanges thereof, a spring on said bar and bearing at one end against said body and at its other against the connecting portion of the frame and normally tending to rock the frame in one direction about its pivotal mounting, a dog pivotally mounted on said bar and bearing against the connecting portion of the frame, a slide mounted on said body and connected at one end to said dog, a crank means pivotally mounted on said body, said crank means including an offset portion connected to the other end of said slide, and said crank means rockable on the body to shift said slide and cause said dog to act against the frame and rock the latter against the action of the spring.

11. In a drive attachment for automobiles, a body, a clamp having an open end to receive a running board, means pivotally attaching the clamp to the body, said clamp movable on said means to dispose the open end of the clamp at either side of the body whereby to clamp the body to the running-board at either side of an automobile with the body having its ends disposed in the same relation to the running-board of the automobile, means movably mounted on said body, a roller, a shaft mounting said roller on said means and extending from each side of the roller, spring means normally tending to move said means and the roller in one direction relative to said body, and manually operable means for controlling the position of the roller and its mounting means.

LUDWIG SEGERSTROM.